United States Patent
Matsukawa (10) Patent No.: US 9,038,599 B2
(45) Date of Patent: May 26, 2015

(54) FUEL INJECTION ADAPTERS AND RELATED SYSTEMS AND METHODS

(75) Inventor: Matthew M. Matsukawa, Kaysville, UT (US)

(73) Assignee: GO NATURAL CNG, LLC, Woods Cross, UT (US)

(*) Notice: Subject to any disclaimer, the term of this patent is extended or adjusted under 35 U.S.C. 154(b) by 566 days.

(21) Appl. No.: 13/463,608

(22) Filed: May 3, 2012

(65) Prior Publication Data

US 2013/0112171 A1     May 9, 2013

Related U.S. Application Data

(60) Provisional application No. 61/482,113, filed on May 3, 2011.

(51) Int. Cl.
| | |
|---|---|
| F02M 69/46 | (2006.01) |
| F02M 61/14 | (2006.01) |
| F02M 55/02 | (2006.01) |
| F02M 43/00 | (2006.01) |
| F02M 21/02 | (2006.01) |

(52) U.S. Cl.
CPC ............. *F02M 55/025* (2013.01); *F02M 43/00* (2013.01); *F02M 61/145* (2013.01); *F02M 21/0281* (2013.01)

(58) Field of Classification Search
USPC .......................... 123/470, 456, 525, 527, 575
See application file for complete search history.

(56) References Cited

U.S. PATENT DOCUMENTS

| | | | | |
|---|---|---|---|---|
| 3,100,478 | A * | 8/1963 | Crooks | 123/21 |
| 5,027,778 | A * | 7/1991 | Nogi et al. | 123/472 |
| 5,035,358 | A * | 7/1991 | Katsuno et al. | 239/403 |
| 5,148,788 | A * | 9/1992 | Saikalis et al. | 123/339.27 |
| 5,211,682 | A * | 5/1993 | Kadowaki et al. | 123/531 |
| 5,449,120 | A * | 9/1995 | Tani et al. | 239/397.5 |
| 5,551,400 | A * | 9/1996 | Rice et al. | 123/470 |
| 5,592,924 | A * | 1/1997 | Audisio et al. | 123/525 |
| 5,597,121 | A * | 1/1997 | Munezane et al. | 239/408 |
| 5,657,733 | A * | 8/1997 | Dozier et al. | 123/470 |
| 5,713,336 | A * | 2/1998 | King et al. | 123/525 |
| 5,890,476 | A * | 4/1999 | Grant | 123/585 |
| 6,367,443 | B1 * | 4/2002 | Bassi et al. | 123/198 F |
| 6,382,182 | B1 * | 5/2002 | Green et al. | 123/406.75 |
| 6,988,492 | B2 * | 1/2006 | Shetley | 123/525 |
| 7,874,283 | B2 * | 1/2011 | Farrow et al. | 123/470 |
| 2002/0195088 | A1* | 12/2002 | Oprea | 123/525 |
| 2004/0139950 | A1* | 7/2004 | Flynn et al. | 123/585 |
| 2011/0073074 | A1* | 3/2011 | Hay et al. | 123/456 |
| 2011/0108004 | A1* | 5/2011 | Wickstone | 123/468 |

* cited by examiner

*Primary Examiner* — Hieu T Vo
*Assistant Examiner* — Sherman Manley
(74) *Attorney, Agent, or Firm* — Oblon, McClelland, Maier & Neustadt, L.L.P.

(57) ABSTRACT

A fuel injection adapter can include a primary cavity into which a primary fuel injector can be received and a secondary cavity into which a secondary fuel injector can be received. A channel can provide fluid communication between the primary and secondary cavity, and the primary cavity can be in fluid communication with an outlet of the fuel injection adapter.

15 Claims, 10 Drawing Sheets

FUEL INJECTION ADAPTERS AND RELATED SYSTEMS AND METHODS

CROSS-REFERENCE TO RELATED APPLICATIONS

This application claims the benefit of U.S. Provisional Application No. 61/482,113, filed May 3, 2011, titled FUEL INJECTION ADAPTERS AND RELATED SYSTEMS AND METHODS, the entire contents of which are hereby incorporated by reference herein.

TECHNICAL FIELD

The present disclosure relates to fuel injection devices and related systems and methods.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Embodiments disclosed herein can be used in retrofitting an automotive vehicle (e.g., car, truck, or van) to operate on more than one fuel source. For example, the automotive vehicle may originally be configured to operate using a primary or original fuel source, such as a liquid source of fuel (e.g., gasoline or diesel fuel), in its internal combustion engine. New or replacement components may be provided so as to permit the vehicle to selectively use either the original fuel source or a secondary or alternative fuel source, such as a gaseous source of fuel (e.g., compressed natural gas, propane, and/or hydrogen fuel) in the internal combustion engine. As will be appreciated from the disclosure herein, certain embodiments can be installed quickly and/or with little or no alteration to an original, factory intake manifold. Other and/or further advantages will also be apparent from the present disclosure.

Figure 1:
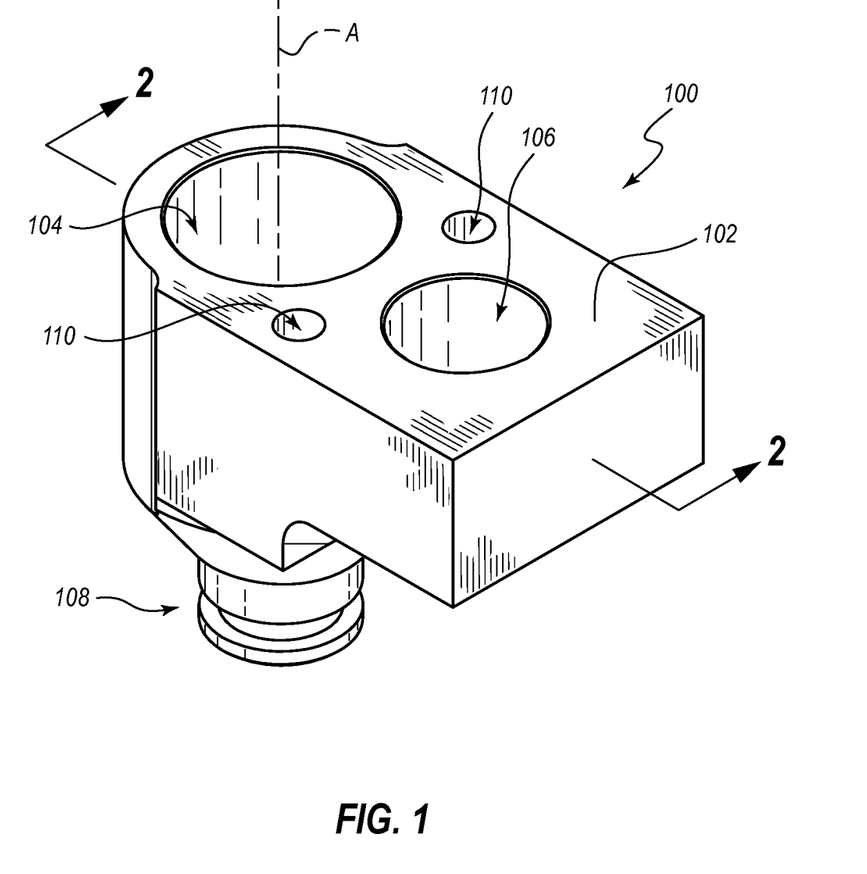
FIG. 1 is a perspective view of an embodiment of a fuel injection adapter.
Figure 2:
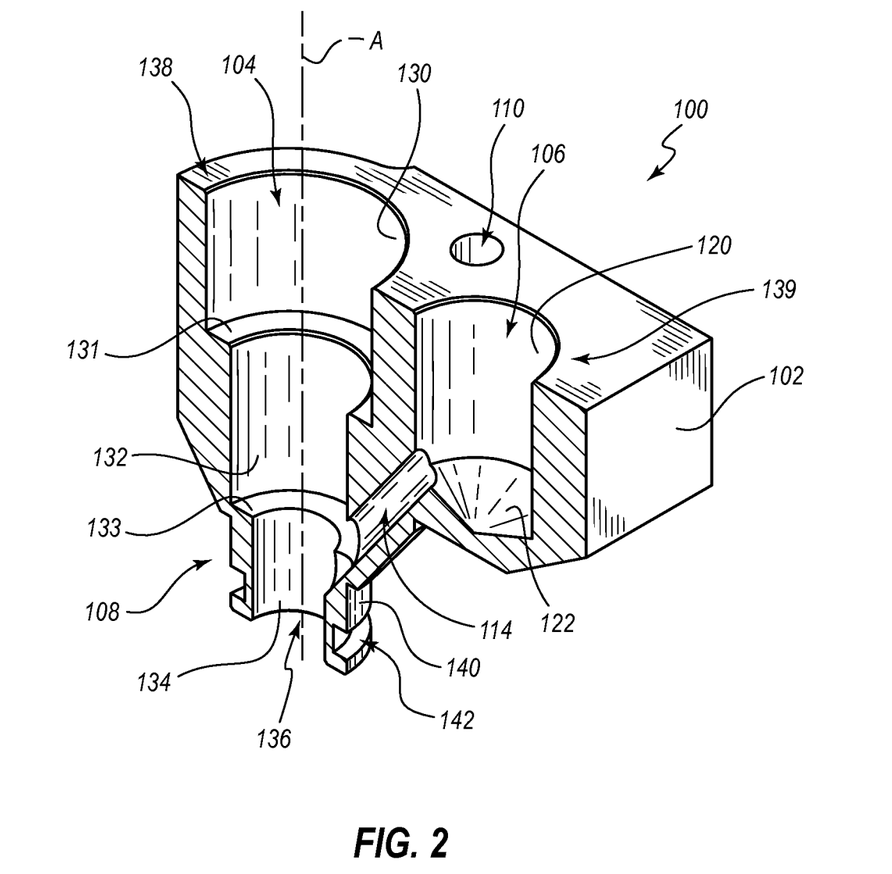
FIG. 2 is a cross-sectional view of the fuel injection adapter of FIG. 1 taken along the view line 2-2 in FIG. 1.
Figure 3:
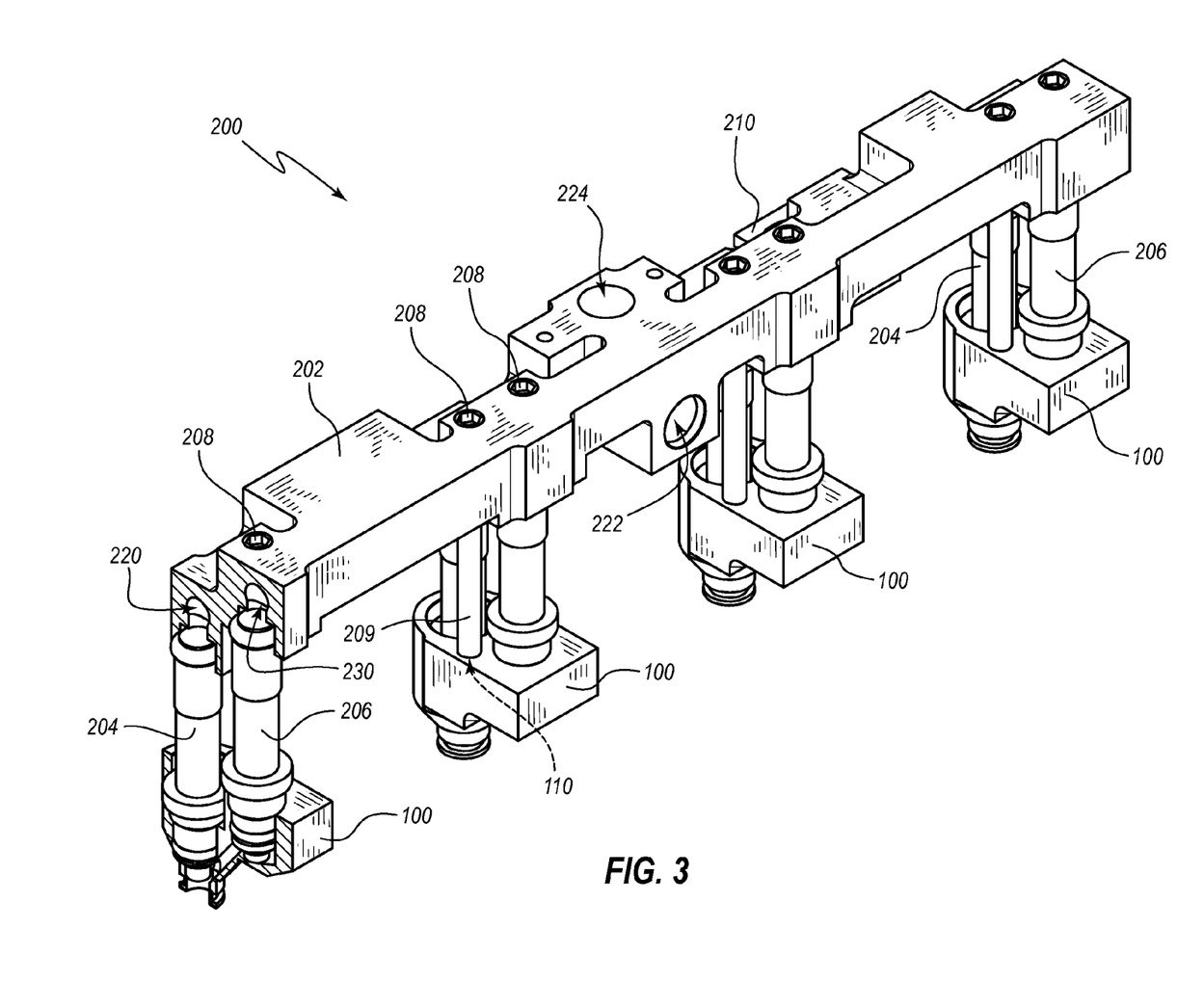
FIG. 3 is a front perspective view of an embodiment of a fuel injection assembly that includes multiple fuel injection adapters, such as that depicted in FIG. 1, coupled with an embodiment of a fuel rail, wherein an end portion of the fuel rail is shown in cross-section.

FIGS. 1-2 illustrate an embodiment of a fuel injection adapter 100, and FIGS. 3-7 depict various views of an embodiment of a fuel injection assembly 200 that includes multiple fuel injection adapters 100. As seen in FIG. 3, the assembly 200 can include a fuel rail 202, a plurality of primary fuel injectors 204 that can be connected to the fuel rail 202, and a plurality of secondary fuel injectors 206 that also can be connected to the fuel rail 202. Each fuel injection adapter 100 can be connected with a primary fuel injector 204 and a secondary fuel injector 206. The fuel injection assembly 200 may also be referred to as a fuel injection system. Moreover, as discussed further below with respect to FIG. 8, the fuel injection assembly 200 can be comprised within a larger fuel injection system 300.

With reference to FIG. 1, the fuel injection adapter 100 can include a body 102. The body 102 may be formed of any suitable material, such as any suitable metal, plastic, etc. In the illustrated embodiment, the body 102 comprises a unitary piece of rigid material. A primary cavity 104 and a secondary cavity 106 are defined by the body 102, and may be formed in any suitable manner. For example, the cavities 104, 106 may result from casting, molding, and/or milling processes. The primary cavity 104 can be sized and shaped to receive at least a portion of a primary fuel injector 204, and the secondary cavity 106 can be sized and shaped to receive at least a portion of a secondary fuel injector 206, as discussed further below.

The body 102 can further define a connection protrusion 108, which can be aligned with the primary cavity 104. For example, the connection protrusion 108 can define a central axis A that is collinear with a central axis defined by the primary cavity 104. The body 102 also can include connector openings 110 that are configured to assist in coupling the fuel injection adapter 100 with the fuel rail 202, as discussed further below. The connection protrusion 108 may also be referred to as a connection stem or output stem.

With reference to FIG. 2, the secondary cavity 106 may be defined by sidewall 120 and base wall 122 portions of the body 102. The sidewall 120 may be substantially cylindrical, or may otherwise be shaped so as to be complementary to or otherwise receive at least an output end of a secondary fuel injector 206. In the illustrated embodiment, the base wall 122 is substantially conical.

The primary cavity 104 may be defined by one or more sidewalls or sidewall portions 130, 132 defined by the body 102. The sidewall portions 130, 132 may be substantially cylindrical, or may otherwise be shaped so as to be complementary to or otherwise receive portions of a primary fuel injector 204 that are inserted into the primary cavity 104. In the illustrated embodiment, all of the sidewall portions 130, 132 are substantially aligned. For example, each sidewall portion 130, 132 can define a separate central axis, and the central axes can be collinear. The sidewall portions 130, 132 can be joined by a transversely projecting shelf 131. An additional sidewall portion 134 can define an output port 136 through which fuel can be expelled from the fuel injection adapter 100. The sidewall portions 132, 134 can be joined by a transversely projecting shelf 133. The output port 136 may be viewed as an extension of the primary cavity 104, or stated otherwise, the cavity 104 can be in fluid communication with the output port 136. In view of the arrangement shown in FIG. 2, the sidewall portions 130, 132, 134 may be referred to hereafter as the upper sidewall 130, the intermediate sidewall 132, and the lower sidewall 134.

A channel 114 extends between and fluidly connects the primary and secondary cavities 104, 106. In the illustrated embodiment, the channel 114 extends through a portion of the sidewall 120 and the base wall 122 of the secondary cavity 206, and also extends through the intermediate and lower sidewalls 132, 134 and the shelf 133 of the primary cavity 204 (also shown in FIG. 4). It may be said that the lower end of the secondary cavity 106 is closed, except for an opening into the channel 114. However, a lower end of the primary cavity 204, namely the output port 136, is open such that fuel from either cavity 204, 206 can be expelled from the fuel injection adapter 100 via the output port 136, as discussed further below.

In the illustrated embodiment, the channel 114 is substantially linear, and a central axis defined by the channel 114 is at an angle relative to central axes defined by the primary and secondary cavities 104, 106. Specifically, in the illustrated embodiment, the primary and secondary cavities 104, 106 define central longitudinal axes that are substantially parallel to each other, and the central longitudinal axis of the channel 114 extends at a nonparallel, non-perpendicular angle relative the central longitudinal axes of the cavities 104, 106. Such an arrangement can result from the portion of the body 102 that is associated with the secondary cavity 104 being upwardly or vertically offset relative to the portion of the body 102 that is associated with the primary cavity 102. Each offset portion of the body 102 may be referred to as a cup portion, due to the generally cup-shaped exterior and interior that they define (see also FIG. 4). Accordingly, the body 102 can be said to include a primary cup portion 138 and a secondary cup portion 139. Such an offset between the primary and secondary cup portions 138, 139 may be desirable, as it spaces the portion of the body 102 that is associated with the secondary cavity 106 upwardly and away from the connection protrusion 108. In some embodiments, this spacing can permit the connection protrusion 108 to be readily inserted into a branch of an intake manifold 360 in the same manner that a primary fuel injector 204 would be so inserted in the absence of the fuel injection adapter 100, as can be appreciated from the discussion of FIG. 4 below.

In the illustrated embodiment, a diameter of the sidewall 120 of the secondary cavity 106 is substantially the same as a diameter of the intermediate sidewall 132 of the primary cavity 104. The primary and secondary cavities 104, 106 thus may be configured to receive similarly dimensioned fuel injectors 204, 206. However, other arrangements are also contemplated. For example, the cavities 104, 106 may be configured to receive differently proportioned fuel injectors 204, 206.

Figure 4:
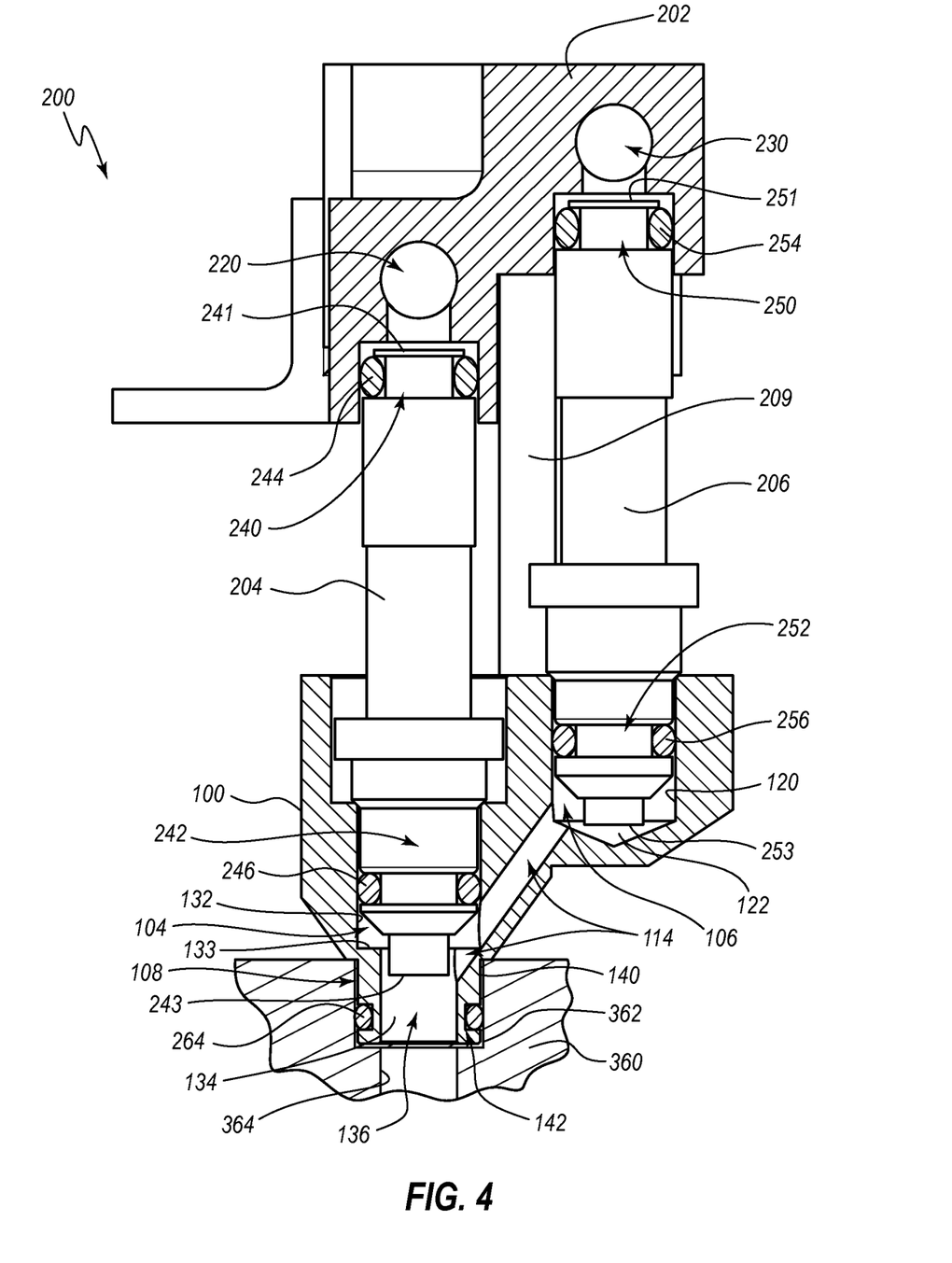
FIG. 4 is an end-on elevation view of the fuel injection assembly of FIG. 3 coupled with an air intake manifold, wherein an embodiment of a fuel rail, a fuel injection adapter, and a portion of the air intake manifold are shown in cross-section.

As can be seen in FIGS. 2 and 4, an inner diameter of the intermediate sidewall 132 of the primary cavity 104 can be about the same or slightly larger than an outer diameter of an outer wall 140 of the connection protrusion 108. Additionally, the outer wall 140 of the connection protrusion 108 can define a groove or recess 142 that is configured to receive an O-ring 264 (FIG. 4) or other suitable sealing member.

As shown in FIG. 4, the sidewall 132 of the primary cavity 104 can be shaped similarly or substantially the same as an upper sidewall 362 that is defined by a branch of an intake manifold 360, and an outer surface of the projection protrusion 108 can be shaped similar to, substantially the same as, or identical to at least a portion of an output end of a primary fuel injector 204. The primary cavity 104 thus can be shaped and sized so as to act in a manner such as the branch of an intake manifold 360 to which the primary fuel injector 204 would normally be connected, in the absence of the fuel injection adapter 100. Similarly, the connection protrusion 108 can be shaped and sized so as to act in a manner such as the output end of a primary fuel injector 204 so as to thereby connect the fuel injection adapter 100 to the intake manifold 360. Stated otherwise, the connection protrusion 108 of the fuel injection adapter can be configured to interface with the intake manifold 360 in a manner identical or similar to the manner in which the primary fuel adapter 204 would interface with the intake manifold 360—that is, coupling interface regions of connection protrusion 108 and of the primary fuel injector 204 can be identical to each other. Moreover, the output end of the fuel injector 204 can interface with the intermediate sidewall 246 of the fuel injection adapter 100 in an identical or similar manner to the way that it would interface with the intake manifold 360. In some instances, arrangements of the fuel injection adapter 100 such as just described can be useful in retrofitting applications, as the connection protrusion 108 can provide a connection to the intake manifold 360 without any alterations being made the intake manifold 360. Similarly, in certain arrangements, the fuel injection adapter 100 can be used with a standard primary fuel injector 204 that may typically be used with a particular intake manifold 360 arrangement.

Other embodiments of the fuel injection adapter 100 are also contemplated. For example, in some embodiments, the vertical offset of the secondary sidewall 120 relative to the primary intermediate sidewall 132 may be less pronounced, or even absent, and/or the angle or shape of the channel 114 that extends between the primary and secondary cavities 104, 106 may be different from that shown. For example, in some embodiments, the channel 114 may define an angle of no less than about 30, 45, 60, 75, or 90 degrees, no greater than about 30, 45, 60, 75, or 90 degrees, or about 30, 45, 60, 75, or 90 degrees relative to the central axis A of the primary cavity 104, as measured from the upwardly directed portion of the central axis A in the orientation shown in FIG. 2. In other or further embodiments, the sidewalls 120, 132 may define central longitudinal axes that are nonparallel, as opposed to the substantially parallel longitudinal axes of the illustrated configuration. In still other or further embodiments, the upper sidewall portion 130 may be eliminated—for example, at least a portion of the body 102 that defines the upper sidewall 130 may be omitted, as discussed further below with respect to FIGS. 9 and 10.

Figure 5:
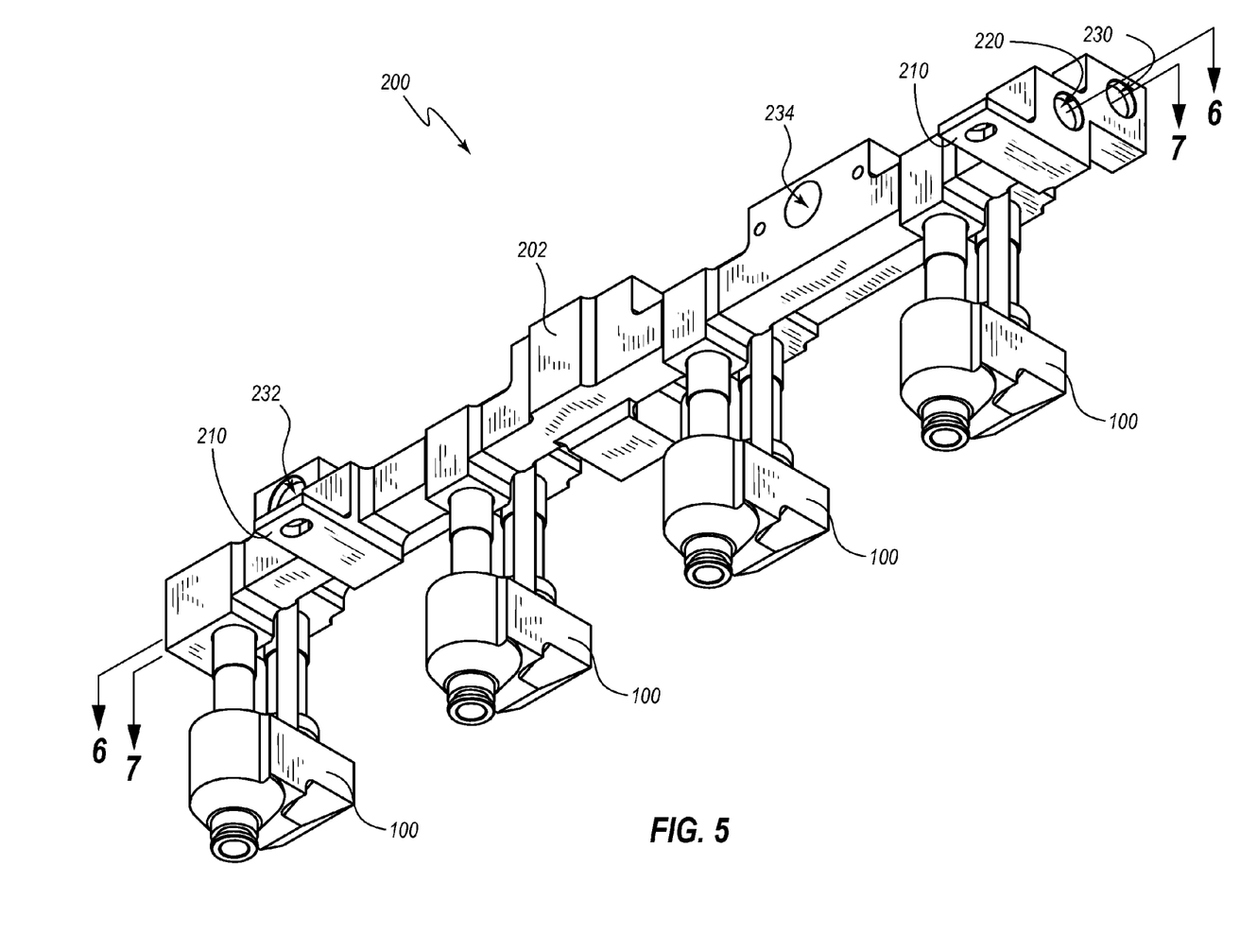
FIG. 5 is a rear perspective view of the fuel injection assembly of FIG. 3.
Figure 6:
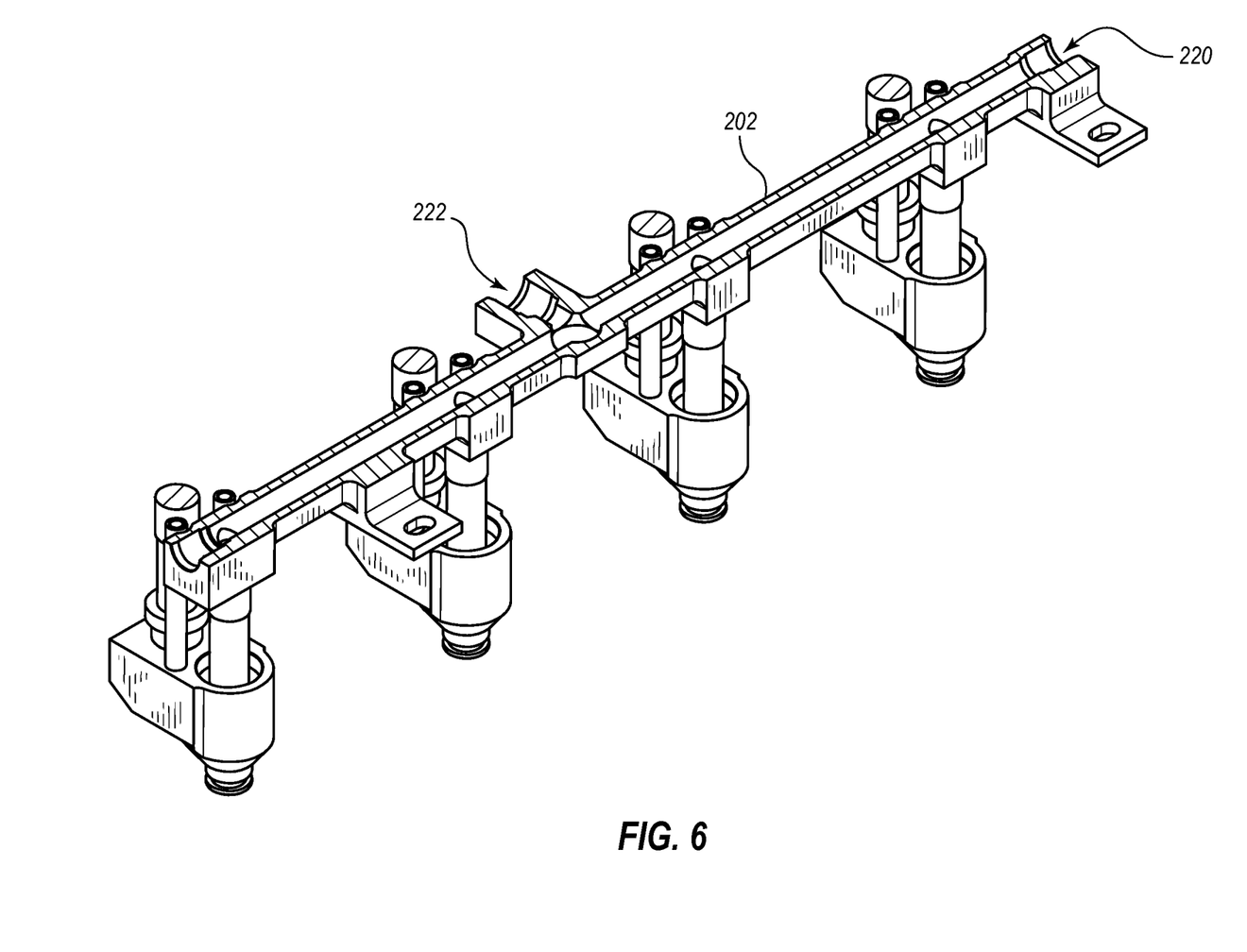
FIG. 6 is a cross-sectional view of the fuel injection assembly of FIG. 3 taken along the view line 6-6 in FIG. 5.
Figure 7:
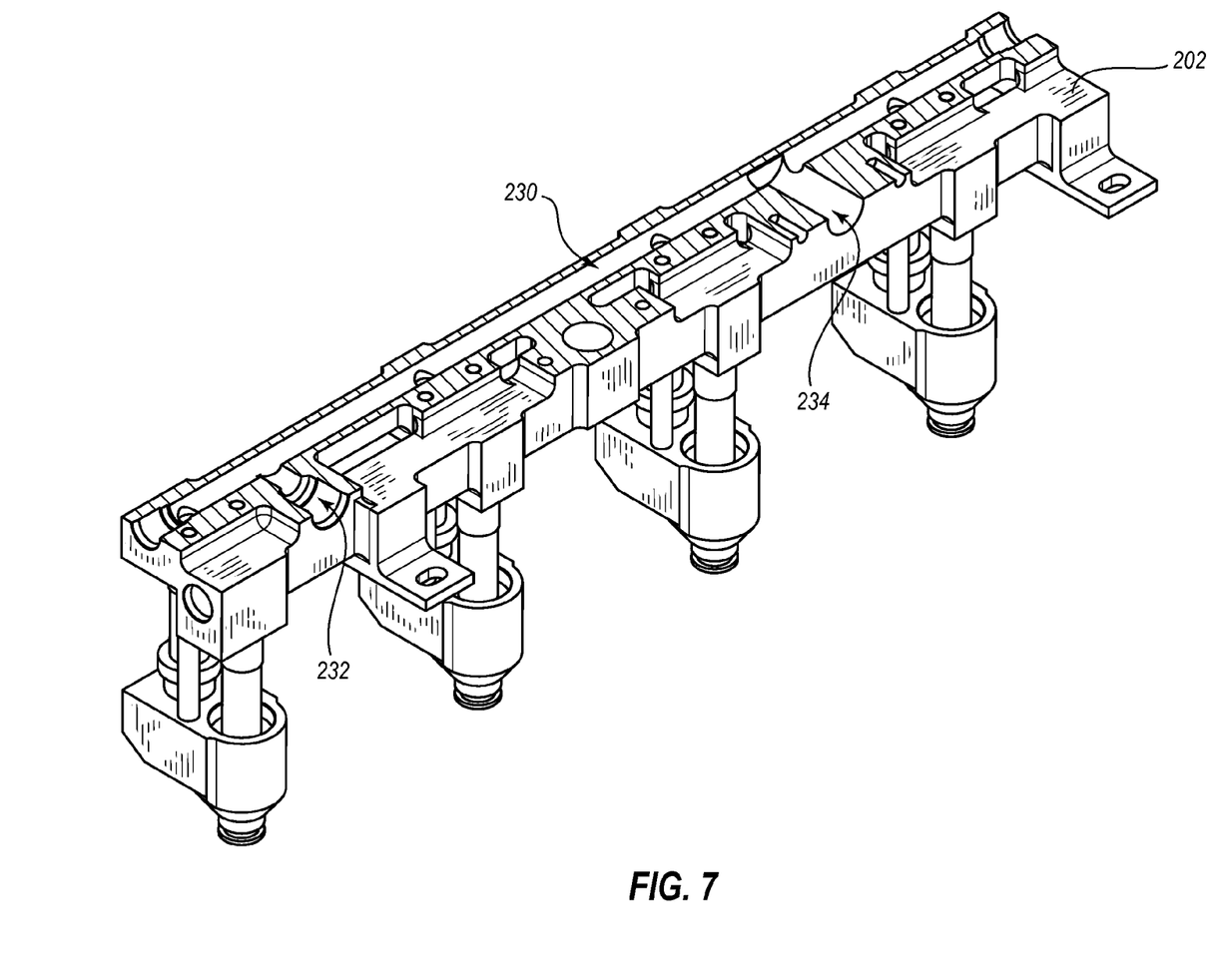
FIG. 7 is another cross-sectional view of the fuel injection assembly of FIG. 3 taken along the view line 7-7 in FIG. 5.

With reference to FIGS. 3 and 5-7, the fuel rail 202 can define two fluidly isolated or separate fuel channels 220, 230. The primary fuel channel 220 can be coupled with an original or primary fuel line (e.g., a gas or diesel line) at a primary inlet port 222 (FIGS. 3 and 6), and the secondary fuel channel 230 can be coupled with a secondary fuel line (e.g., a compressed natural gas line) at a secondary inlet port 232 (FIGS. 5 and 7). The fuel rail 202 may also be referred to as a bi-fuel rail, as it is configured to transport two separate fuels therethrough. Moreover, the fuel rail 202 may also be referred to as a fuel rail system. In the illustrated embodiment, the fuel rail 202 comprises a unitary piece of material that defines the separate fuel channels 220, 230. Such an arrangement can provide an element of simplicity to the overall construction of the assembly 200, and can reduce the number of parts and/or amount of material used in the assembly 200. However, in other embodiments, the fuel rail 202 (or fuel rail system) can include two separate fuel rail pieces that are attached to each other. Each separate fuel rail piece can define one of the primary or secondary fuel channels 220, 230.

The fuel rail 202 can define a primary sensor port 224 (FIG. 3) that is in fluid communication with the primary fuel channel 220, and further, can define a secondary sensor port 234 (FIG. 5) that is in fluid communication with the secondary fuel channel 230. Any suitable sensor, such as a transducer (e.g., pressure transducer), may be used in the sensor ports 224, 234 to monitor a physical property of interest (e.g., pressure) of fuel within the respective fuel channels 220, 230. The fuel rail 202 may be formed of any suitable material, such as any suitable metal, plastic, etc. In other embodiments, one or more of the sensor ports 224, 234 may be omitted.

The fuel rail 202 can define openings through which any suitable fasteners, attachment devices, or connectors 208, such as bolts, for example, can be advanced. In the drawings, the openings are not shown in an open state, but rather, connectors 208 are shown as having been advanced through the openings so as to connect the fuel rail 202 to the fuel injection adapters 100. As can be appreciated from the various views in FIGS. 3-7, each fuel injection adapter 100 is connected to the fuel rail 202 via two connectors 208 that extend through the fuel rail 202 and into the connector openings 110. In some embodiments, the connector openings 110 may be threaded so as to receive a distal end of the connectors 208.

In the illustrated embodiment, a spacer 209 is included between each fuel injection adapter 100 and the fuel rail 202. The spacers 209 can ensure a desired spacing between the fuel rail 202 and the fuel injection adapters 100. For example, the spacing can be selected so as not to deform the fuel injectors 204, 206 via excessive compressive forces, such as could result from over-tightening of the connectors 208 to the fuel injection adapters 100. The spacers 209 can reinforce or provide structural integrity to the fuel injection assembly 200. For example, the spacers 209 can prevent twisting of the fuel injection assembly 200. In some embodiments, the spacers 209 are separate units, such as hollow tubes, through which the connectors 208 are inserted. An inner diameter of the tube may be greater than an outer diameter of the connector 208, such that there is little or no direct interaction between the connectors 208 and the spacers 209. In other embodiments, the connectors 208 can be directly attached to the spacers 209 and/or the fuel injection adapters 100. For example, in some embodiments, the spacers 209 and/or the connector openings 110 of the adapters 100 can include threading for interacting with threading on the connectors 208. In some embodiments, the spacers 209 rest against outer surfaces of the adapters 100 and the fuel rail 202. In other or further embodiments, a spacer 209 may be received within a socket (e.g., a bore hole, a connector opening 110) in the adapter 100 and/or a socket in the fuel rail 202.

The fuel rail 202 can define one or more mounting tabs or brackets 210 that can be used to connect the fuel rail 202 to a suitable portion of the intake manifold 360, and/or to any other suitable portion of the engine or vehicle. The fuel rail 202 may be configured to readily replace such a factory fuel rail with little or no modification of a factory intake manifold 360. For example, in some embodiments, the brackets 210 are sized and configured in the same manner as like brackets that extend from an original or factory compliant single-fuel rail.

With reference to FIG. 4, an upper region or upper end 240 of a primary fuel injector 204 can be connected with the fuel rail 202, and a lower region or lower end 242 of the primary fuel injector 204 can be received within the primary cavity 104 and connected to the fuel injection adapter 100. The upper end of the primary fuel injector 204 can be described as an input end 240 of the primary fuel injector 204, and can include an input port or input tip 241 which can be in fluid communication with the primary fuel channel 220. Moreover, an O-ring 244 or any other suitable sealing member can provide a fluid-tight seal between the fuel injector 204 and the fuel rail 202. The O-ring 246 or other suitable sealing member can provide a fluid-tight seal between the fuel injector 204 and the fuel injection adapter 100. As used herein, the term "fluid" refers to materials in liquid and/or gaseous states.

Similarly, an upper end 250 of a secondary fuel injector 206 can be connected with the fuel rail 202, and a lower end 252 of the secondary fuel injector 206 can be received within the secondary cavity 106 and connected to the fuel injection adapter 100. An input tip 251 of the secondary fuel injector 206 can be in fluid communication with the secondary fuel channel 230. Moreover, an O-ring 254 or any other suitable sealing member can provide a fluid-tight seal between the secondary fuel injector 206 and the fuel rail 202. The O-ring 256 or other suitable sealing member can provide a fluid-tight seal between the fuel injector 206 and the fuel injection adapter 100.

In the illustrated embodiment, the fuel channel 230 is vertically offset relative to the primary fuel channel 220. Such an arrangement can account for a vertical offset between the primary and secondary sides of the fuel injection adapter 100, as previously discussed, when the primary and secondary fuel injectors 204, 206 are similar in height. In other embodiments, the fuel channels 220, 230 may not be vertically offset relative to each other.

With continued reference to FIG. 4, the connection protrusion 108 can be coupled with the intake manifold 360. The O-ring 264 or other suitable sealing member can provide a fluid-tight seal. In the illustrated arrangement, the output end 242 of the primary fuel injector 204 can include an output port or output tip 243 that is directed toward, or aligned with, an inlet of the intake manifold 360. The output tip 243 of the primary fuel injector 204 can comprise a nozzle or the like for injecting fuel into the intake manifold 360. Fuel that is ejected (e.g., sprayed) from the primary fuel injector 204 proceeds directly into the intake manifold 360, and much or all of the ejected fuel can enter the intake manifold 360 without contacting and/or being diverted by any portion of the fuel injection adapter 100. For example, at least a portion of the fuel that is ejected from the fuel injector 204 may proceed along a straight path from the output tip 243 into the intake manifold 360. This may be particularly advantageous where the primary fuel is liquid (e.g., gasoline or diesel fuel), as the fuel injection adapter 100 does not disrupt delivery of the fuel to the intake manifold 360. For example, the primary fuel generally is unlikely to contact, condense on, or accumulate on the lower sidewall 134 of the fuel injection adapter 100 and/or to proceed upwardly through the channel 114. Rather, the primary fuel is delivered in into a channel that is defined by a lower sidewall 364 of the intake manifold 360. In situations where the primary fuel is sprayed, the primary fuel may proceed in a substantially straight, columnar, linear, conical, or otherwise direct route into the intake manifold 360, and at least a portion of the fuel may exit the adapter 100 without ever having contacted the adapter. In some embodiments, the primary fuel may exit the fuel injection adapter 100 without any portion thereof passing through the channel 114 of the adapter. In the illustrated embodiment, a central longitudinal axis defined by the lower sidewall 364 of the intake manifold 360 is substantially collinear with a central longitudinal axis defined by the lower sidewall 134 of the fuel injection adapter 100. The lower sidewall 134 of the fuel injection adapter 100 can act as or be an extension of the input port defined by the intake manifold 360. For example, in the illustrated embodiment, a diameter of the lower sidewall 134 of the fuel injection adapter 100 is approximately the same as a diameter of the lower sidewall 364 of intake manifold 360. In the illustrated embodiment, the output tip 243 is positioned within the output port 136, or stated otherwise, is encompassed by the lower sidewall portion 134. Other arrangements are also possible.

In contrast, an output tip 253 of the secondary fuel injector 206 can be directed toward or aligned with the base wall 122 of the secondary cavity 106. Stated otherwise, fuel that is ejected from the secondary fuel injector 206 does not proceed directly into the intake manifold 360. Rather, a trajectory of the secondary fuel is altered—the secondary fuel is diverted or redirected from through the channel 114 and then through the lower sidewall 134 into the intake manifold 360. Such an arrangement may be particularly suitable where the secondary fuel is gaseous and capable of flowing into the intake manifold 360. In some instances, the gaseous fuel can follow the diverted course without significantly condensing or accumulating on the base wall 122, within the channel 114, and/or within the lower sidewall 134. It is noted that the fluid-tight seals created by the O-rings 246, 256 can prevent the gaseous fuel from escaping from the fuel injection adapter 100 through the upper ends of the cavities 104, 106, respectively. In the illustrated embodiment, a central longitudinal axis defined by the lower sidewall 364 of the intake manifold 360 is parallel to, but not collinear with, a central longitudinal axis defined by the sidewall 132 of the secondary cavity 106. Stated otherwise, the central longitudinal axis defined by the sidewall 132 is not directed toward, nor does it pass through, an inlet port defined by the sidewalls 362, 364 of the intake manifold 360.

Figure 8:
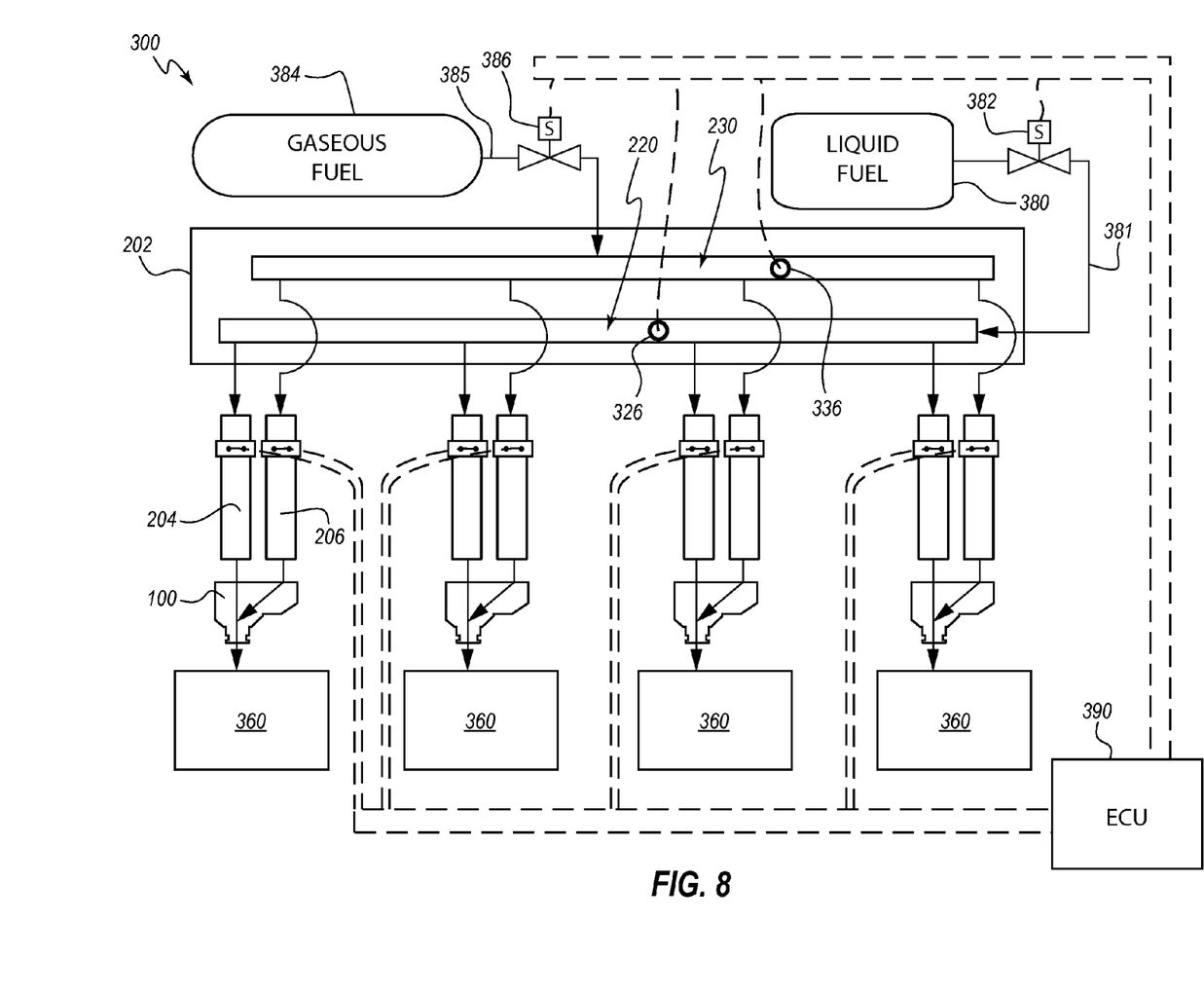
FIG. 8 is a schematic view of an embodiment of a fuel injection system that includes the embodiment of a fuel injection assembly depicted in FIG. 3.

FIG. 8 illustrates an embodiment of a fuel injection system 300 that can employ embodiments of the fuel injection adapters 100 and fuel injection assemblies 200 discussed above. The system 300 can include a primary fuel source 380, which may include a liquid fuel (e.g., gasoline) and a secondary fuel source 384, which may include a gaseous fuel (e.g., compressed natural gas). The primary fuel may be moved from the source 380 through a primary fuel line 381 in any suitable manner, such as via a fuel pump (not shown). The fuel line 381 can be fluidly connected to the primary fuel channel 220. Any suitable valve, such as a solenoid valve 382 may be used to selectively close the fuel line 381 when the secondary fuel is being used. The secondary fuel may be moved from the source 384 through a secondary fuel line 385 in any suitable manner. For example, the secondary fuel source 384 may be pressurized, and the secondary fuel line 385 may include any suitable pressure regulation devices (not shown). The secondary fuel line 385 can be fluidly connected to the secondary fuel channel 230. Any suitable valve, such as a solenoid valve 386 may be used to selectively close the secondary fuel line 385 when the primary fuel is being used. The fuel injection system 300 may be said to operate in a first mode when the primary fuel is being used and may be said to operate in a second mode with the secondary fuel is being used. Any suitable sensors 326, 336 (e.g., transducers) may be used with the fuel channels 220, 230, as previously discussed.

An engine control unit (ECU) 390 can be electrically connected with one or more of the valves 382, 386, the sensors 326, 336, and the injectors 204, 206. The ECU can control operation of the engine, including the injection of fuel to the various branches of the intake manifold 360. A user may determine whether the primary or secondary fuel will be used, and the ECU can send operational signals to open and close the valves 382, 386, as appropriate. Feedback from the appropriate sensor 326, 336 can be used in determining such parameters as the pulse width, or time interval over which the appropriate injector valve 204, 206 should be held open so as to provide fuel to the engine for combustion. These and or other suitable operations can be controlled by the ECU 390, such as providing operational signals to the injector valves 204, 206.

As previously discussed, in some embodiments, the secondary fuel travels from the secondary fuel injector 206 along a diverted path through the fuel injection adapter 100 before entering the intake manifold 360. In some instances, this additional path length and volume, which may result in a delay and/or initial reduction in concentration or amount of fuel delivered to the intake manifold 360, may affect the pulse length or other operational parameters of the secondary fuel injector 206. These operational parameters can be adjusted or controlled by the ECU 390, as appropriate. Also, in some embodiments, a fuel injection adapter 100 distances a distal end of a primary fuel injector 204 from an inlet of the intake manifold 360 (see FIG. 4). This may also result in a slight delay and/or initial reduction in concentration or amount of fuel delivered to the intake manifold 360, and may affect the pulse length or other operational parameters of the primary fuel injector 204. These operational parameters can be adjusted or controlled by the ECU 390, as appropriate.

The number of fuel injection adapters 100 that may be used with a given fuel injection system can vary, as desired or as appropriate. Similarly, the number of ports defined by the fuel rail 202 that can receive pairs of fuel injectors 204, 206 can vary from those shown in the drawings. For example, in some embodiments, a fuel rail 202 includes ports for receiving no fewer than three, four, five, or six pairs of fuel injectors 204, 206. Moreover, in some embodiments, multiple fuel rails 202 may be used. For example, two fuel rails 202 and associated sets of fuel injectors 204, 206 and fuel injection adapters 100 (for a total of 8 fuel injection adapters 100) may be used with a V8 engine. Other suitable variations and alterations are also contemplated.

Figure 9:
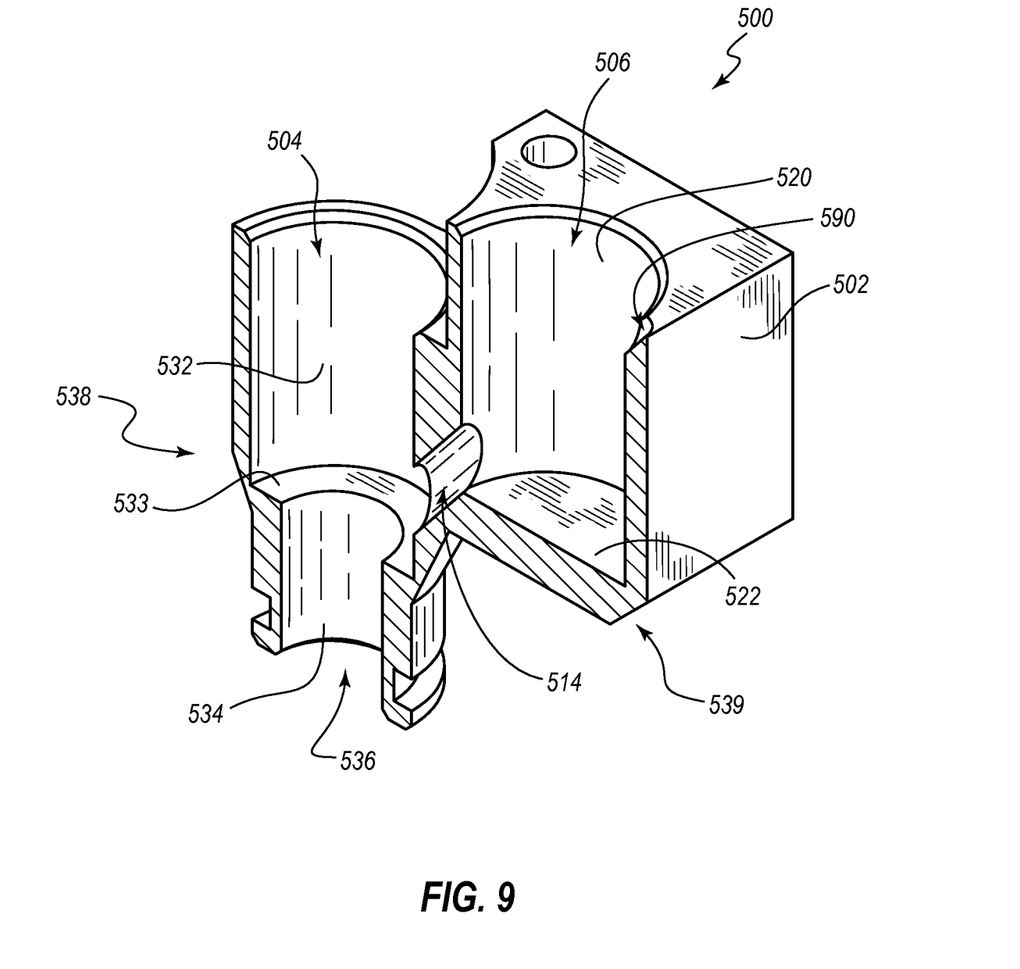
FIG. 9 is a cross-sectional view of another embodiment of a fuel injection adapter.

FIG. 9 illustrates another embodiment of a fuel injection adapter 500 that can resemble the fuel injection adapter 100 described above in certain respects. Accordingly, like features are designated with like reference numerals, with the leading digits incremented to "5." Relevant disclosure set forth above regarding similarly identified features thus may not be repeated hereafter. Moreover, specific features of the adapter 500 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the adapter 500. Any suitable combination of the features and variations of the same described with respect to the adapter 100 can be employed with the adapter 500, and vice versa. This pattern of disclosure applies equally to further embodiments depicted in subsequent figures and described hereafter, wherein the leading digits may be further incremented.

The fuel injection adapter 500 includes a body 502 that includes a primary cup portion 538 and a secondary cup portion 539. The primary cup portion 538 includes a primary cavity 504 and the secondary cup portion 539 includes a secondary cavity 506.

The primary cup portion 538 generally resembles the primary cup portion 138 described above. However, the primary cavity 504 is shorter. Whereas a portion of the body 102 defines the upper sidewall 130, as shown in FIG. 2, an analogous portion of the body 502 is eliminated. Accordingly, any analogue to the upper sidewall 130 is omitted in the adapter 500. The adapter 500 can include a sidewall 532 that defines the primary cavity 504 and a lower sidewall 534 that defines an outlet port 536. The sidewalls 532, 534 can resemble the sidewalls 132, 134 discussed above.

The secondary cup portion 539 generally resembles the secondary cup portion 139 described above. However, a base wall 522 is planar, whereas the base 122 wall illustrated in FIG. 2 is conical. Additionally, a small notch 590 is included at the upper end of the secondary cavity 590, which may result from a machining process used to create the channel 514 that fluidly connects the primary and secondary cavities 504, 506.

Figure 10:
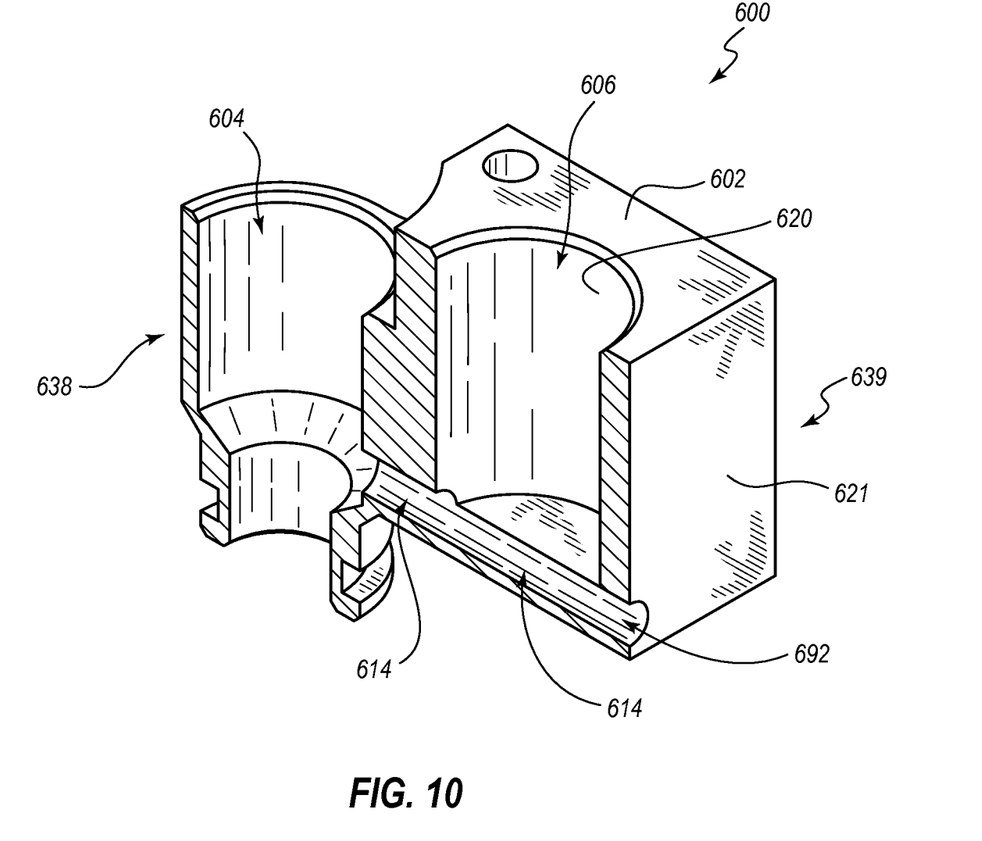
FIG. 10 is a cross-sectional view of another embodiment of a fuel injection adapter.

FIG. 10 illustrates another embodiment of a fuel injection adapter 600, which includes a body 602 that defines a primary cup portion 638 and a secondary cup portion 639. The primary cup portion 638 includes a primary cavity 604 and the secondary cup portion 639 includes a secondary cavity 606.

The secondary cup portion 639 generally resembles the secondary cup portions 139, 539 described above. However, a channel 614 that fluidly connects the primary and secondary cavities 604, 606 is formed by a bore 692 that extends through a sidewall 620 of the body 602. In some embodiments, the bore 692 may be formed via a machining process. The portion of the bore that extends through an outer wall 621 of the body 602 can be plugged in any suitable manner.

Although much of the foregoing disclosure is discussed in the context of retrofitting, it should be appreciated that embodiments may be used as original components in a factory produced vehicle. Any suitable use of the apparatus, assemblies, systems, and methods discussed herein is contemplated.

Use of the terms "primary" and "secondary" herein is for the sake of convenience and is not intended to limit the scope of the disclosure. For example, in some embodiments, a primary fuel source may in fact be of a gaseous form, whereas a secondary fuel source may be of a liquid form. In still other embodiments, both the primary and secondary fuels may be in liquid form, or both may be in gaseous form.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of one or more of the terms "about," "approximately," "substantially," and "generally." For each such reference, it is to be understood that, in some embodiments, the value, feature, or characteristic may be specified without approximation. For example, where such a qualifier is used, the terms includes within its scope the qualified word in the absence of the qualifier. For example, where the term "substantially cylindrical" is recited with respect to a feature, it is understood that in further embodiments, the feature can have a precisely cylindrical orientation.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Recitation in the claims of the term "first" with respect to a feature or element does not necessarily imply the existence of a second or additional such feature or element. Elements specifically recited in means-plus-function format, if any, are intended to be construed in accordance with 35 U.S.C. §112 ¶6. Embodiments of the invention in which an exclusive property or privilege is claimed are defined as follows.

The invention claimed is:

1. A fuel injection system comprising:
a fuel rail system that defines a first fuel channel and a second fuel channel that are fluidly isolated from each other;
a first fuel injector coupled with the fuel rail system, wherein an input tip of the first fuel injector is in fluid communication with the first fuel channel;
a second fuel injector coupled with the fuel rail system, wherein an input tip of the second fuel injector is in fluid communication with the second fuel channel; and
an adapter comprising:
a first cavity;
a second cavity;
a channel that fluidly connects the first cavity to the second cavity; and
an output port in fluid communication with each of the first and second cavities,
wherein an output end of the first fuel injector is coupled with the first cavity of the adapter and an output end of the second fuel injector is coupled with the second cavity of the adapter,
wherein the fuel injection system is configured to operate in a first operational mode in which a first fuel passes through the first fuel channel of the fuel rail system, through the first fuel injector, and through the output port of the adapter, and
wherein the fuel injection system is configured to operate in a second operational mode in which a second fuel passes through the second fuel channel of the fuel rail system, through the second fuel injector, through the channel of the adapter, and through the output port of the adapter.

2. The fuel injection system of claim 1, wherein when the fuel injection system operates in the first operational mode, the first fuel passes through the adapter without passing through the channel of the adapter.

3. The fuel injection system of claim 1, wherein the output port of the adapter is an extension of the first cavity, and wherein the second cavity is in fluid communication with the output port via the channel.

4. The fuel injection system of claim 1, wherein at least a portion of the first fuel passes through the adapter without ever contacting the adapter.

5. The fuel injection system of claim 1, wherein at least a portion of the first fuel passes through the output port of the adapter without being diverted from a trajectory that is provided to the first fuel upon exiting the first fuel injector.

6. The fuel injection system of claim 1, wherein the adapter diverts the second fuel from a trajectory that is provided to the second fuel upon exiting the second fuel injector.

7. The fuel injection system of claim 1, wherein the adapter further comprises a connection protrusion, and wherein a coupling interface of the first fuel injector and coupling interface of the connection protrusion are identical to each other.

8. The fuel injection system of claim 1, wherein the adapter is connected to an intake manifold of an engine.

9. The fuel injection system of claim 1, wherein the first fuel is in liquid form and the second fuel is in gaseous form.

10. The fuel injection system of claim 1, further comprising a spacer positioned between the fuel rail system and the adapter.

11. The fuel injection system of claim 1, further comprising a primary fuel source in selective fluid communication with the first fuel channel of the fuel rail system via a first valve and a secondary fuel source in selective fluid communication with the second fuel channel of the fuel rail system via a second valve.

12. The fuel injection system of claim 1, further comprising an engine control unit electrically connected with each of the first and second fuel injectors, wherein the engine control unit is configured to deliver operational signals to the first fuel injector when the fuel injection system is operating in the first operational mode and is configured to deliver operational signals to the second fuel injector when the fuel injection system is operating in the second operational mode.

13. The fuel injection system of claim 1, wherein the adapter comprises a first sidewall that defines at least a portion of the first cavity and comprises a second sidewall that defines at least a portion of the second cavity, wherein a fluid-tight seal is provided between the first fuel injector and the first sidewall and a fluid-tight seal is provided between the second fuel injector and the second sidewall, and wherein the fluid-tight seals prevent the second fuel from exiting the adapter thereat.

14. The fuel injection system of claim 1, further comprising a third fuel injector coupled with the fuel rail system, wherein an input end of the third fuel injector is in fluid communication with the first fuel channel;
   a fourth fuel injector coupled with the fuel rail system, wherein an input end of the fourth fuel injector is in fluid communication with the second fuel channel; and
   an additional adapter comprising:
      a first cavity;
      a second cavity;
      a channel that fluidly connects the first cavity to the second cavity; and
      an output port in fluid communication with each of the first and second cavities,
   wherein an output end of the third fuel injector is coupled with the first cavity of the additional adapter and an output end of the fourth fuel injector is coupled with the second cavity of the additional adapter,
   wherein the first fuel passes through the first fuel channel of the fuel rail system, through the third fuel injector, and through the output port of the additional adapter when the fuel injection system operates in the first operational mode, and
   wherein the second fuel passes through the second fuel channel of the fuel rail system, through the fourth fuel injector, through the channel of the additional adapter, and through the output port of the additional adapter when the fuel injection system operates in the second operational mode.

15. The fuel injection system of claim 1, wherein the fuel rail system comprises a unitary piece of material that defines each of the first and second fuel channels.

\* \* \* \* \*